Patented Dec. 24, 1940

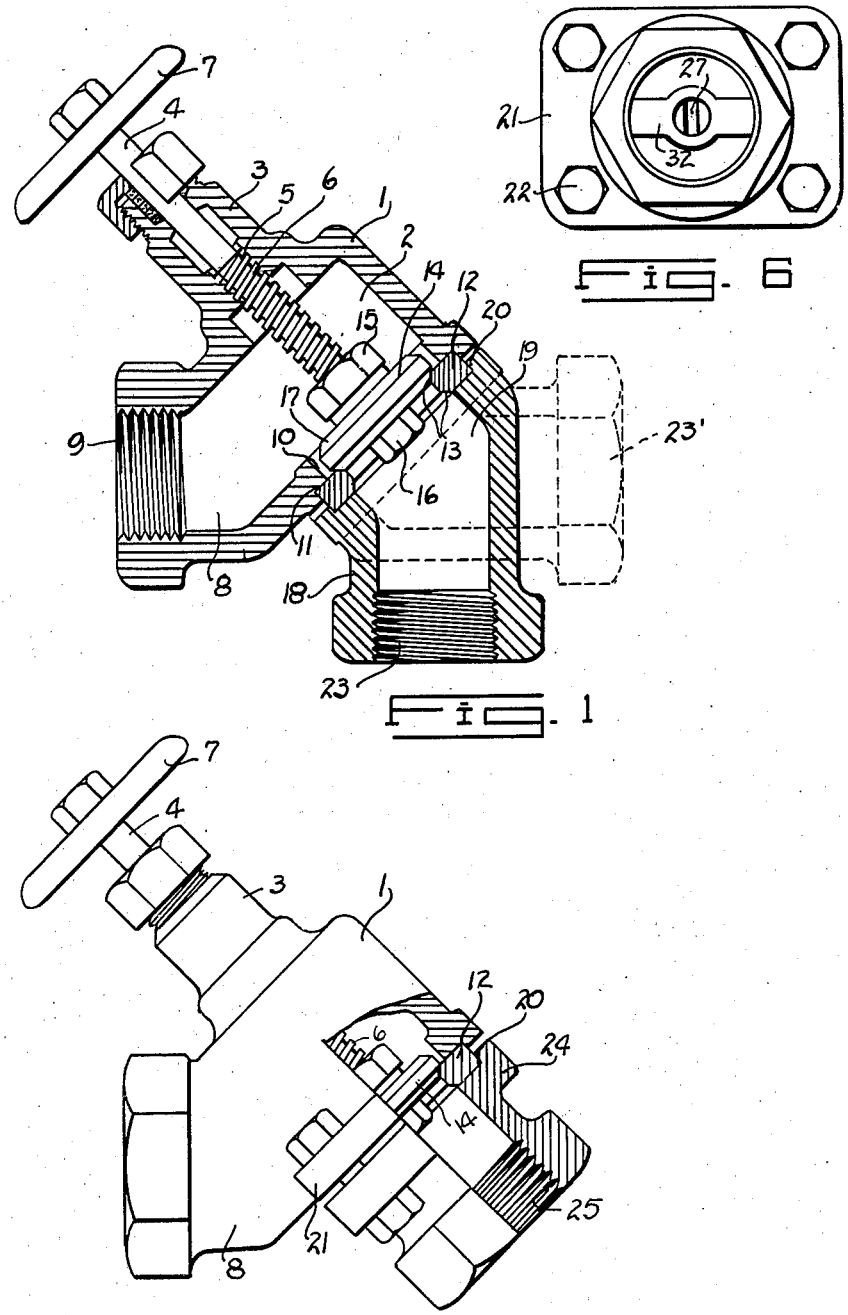

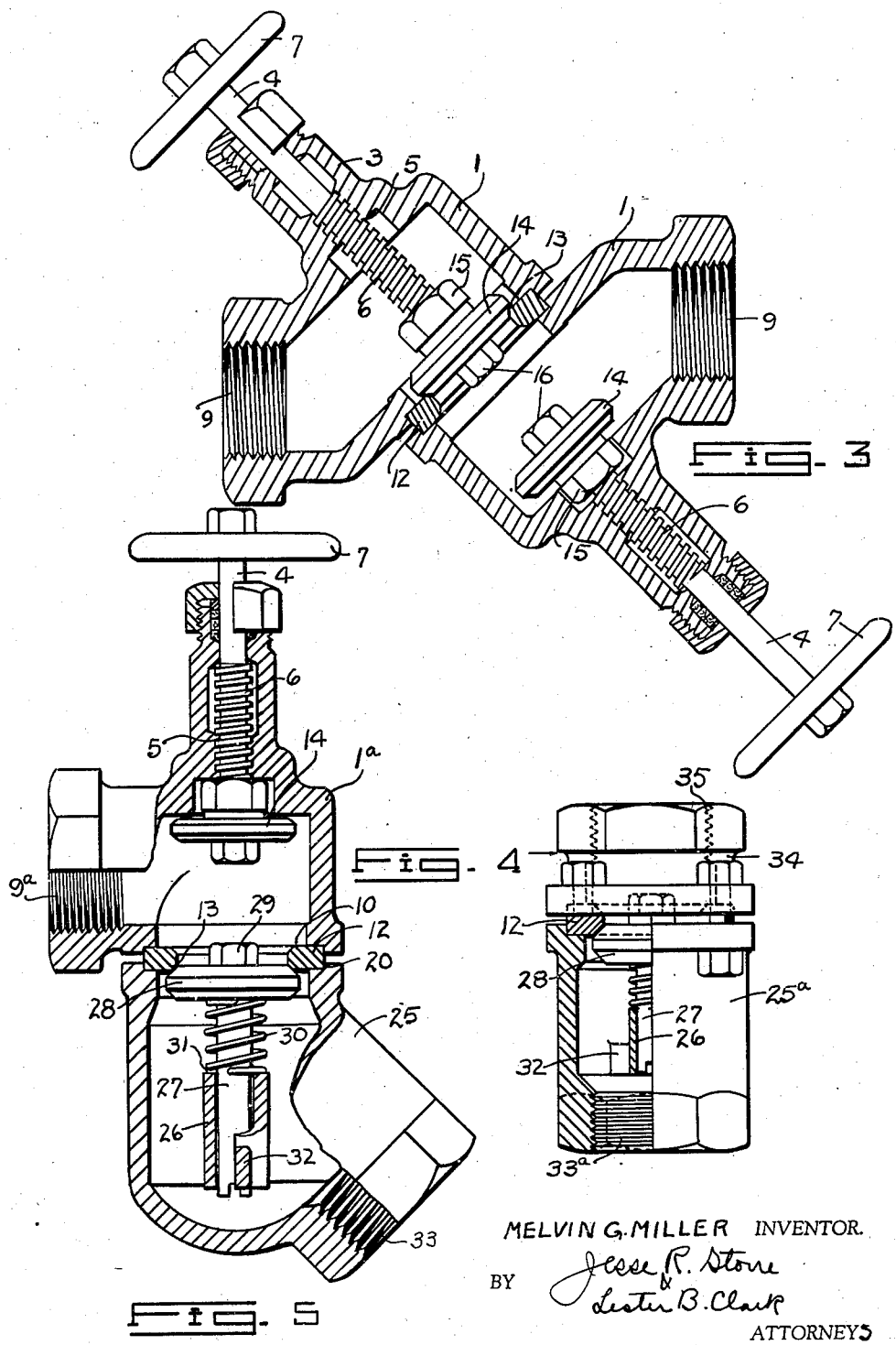

2,225,838

UNITED STATES PATENT OFFICE 2,225,838

VALVE

Melvin G. Miller, Houston, Tex., assignor of fifty per cent to Thomas N. Hunt, Houston, Tex.

Application January 28, 1939, Serial No. 253,269

2 Claims. (Cl. 277—65)

The invention relates to valves for use in fluid conducting lines to control the flow therethrough.

It is an object of the invention to provide a valve to be employed with other similar valves or with a connecting member which is adjustable in various positions.

I also desire to provide a valve which may be employed with a check valve so that when the check valve is not in operation the outlet port may be closed by a manually adjustable valve.

It is a further object of the invention to provide a valve adapted for connection with other valves or other coupling members whereby the course of flow through the valve may be directed in a plurality of directions.

In the drawings herewith,

Fig. 1 is a central longitudinal section through a valve assembly illustrating one embodiment of the invention.

Fig. 2 is a similar view partly in elevation and showing a different coupling member employed with the valve.

Fig. 3 is a central longitudinal section through two separate valves secured together for operation to assure a closure through a fluid conducting line.

Fig. 4 is a side view partly in elevation and partly in section illustrating the construction of a check valve which may be employed with the coupling member.

Fig. 5 is a central longitudinal section through one embodiment of the valve shown in combination with a check valve in the outlet port of the valve body.

Fig. 6 is an end elevation of the check valve disclosed in Fig. 4.

In carrying out my invention I provide a valve body 1, having a valve chamber 2 therein. At one side of the valve chamber is a laterally projecting bonnet 3 which serves as a support for the valve stem 4. The bonnet is provided with an interior threaded portion 5 which cooperates with a threaded section 6 of the valve stem and it will be obvious that this is an ordinary rising stem valve connection. I provide a handle 7 on the valve whereby the valve may be rotated to move the valve stem axially of the bonnet.

There is a lateral port 8 in the valve chamber which is threaded at 9 for connection with pipe or other fluid conducting means. In the embodiment shown in Fig. 1 the port is directed at an upward angle from the valve chamber but it will be obvious that it may be made directly at right angles to the chamber.

There is a second port which in this embodiment is the outlet port shown at 10. The passage through the port 10 is recessed or countersunk slightly at 11 to receive a valve seat ring 12.

Said seat ring is reversible and has a beveled face 13 on either side to form a seat for a valve member 14.

The valve 14 is secured to the forward end of the valve stem by clamping the same between an inner nut 15 on the stem and an outer nut 16 thereon. The valve member is also adapted to be reversed in position. It has lateral seating areas 17 on either end thereof formed to engage the valve seat.

The outlet port 10 is adapted to be connected with a coupling member 18 having a passage 19 therethrough for fluid passing to or from the valve. The coupling member here shown is formed with an annular recess 20 therein to engage with the seat ring 12 and it will be understood that there are laterally projecting flanges 21 at opposite sides of both the valve body 1 and the coupling member 18, as in Figs. 2 and 6. These laterally extending flanges have openings therethrough to receive bolts 22, thus forming the usual flanged connection between the body and the coupling member. It will be noted that the coupling is directed laterally at an angle to the valve seat and in the present instance the threaded outlet 23 in the coupling member is directed at right angles to the inlet 9 to the valve chamber 2. In this case I have thus provided an angle valve which directs the fluid at right angles from its source.

Due to the arrangement of the flange connection 21 it is possible to rotate the coupling member to a position at right angles to its position shown in full lines, and when this is done the outlet 23' will be aligned with the inlet 9, thus producing a passage in direct alignment with the flow of fluid into the valve body. It will be understood that the fluid may pass in either direction through the valve. Ordinarily it is intended that the inlet shall be directed against the upper side of the valve, but obviously it may be in either direction.

In Fig. 2 I have shown a valve body 1 of the same construction as shown in Fig. 1. The coupling member 24, however, is arranged to direct the fluid in a direction axially of the valve stem. This coupling member has a seat 20 to engage with the seat ring 12 and is connected by the same flange connection as shown in Fig. 6. This coupling member is threaded at 25 to receive a pipe or other fluid conducting means.

In Fig. 3 I have shown how my valve may be employed with another identical valve to produce a structure whereby two valves are adapted to seat on opposite sides of the same seat and thus assure a seal at the seat. When this is done it will be obvious that when one of the valves 14 becomes worn so that leakage occurs along the valve seat 13, it may be withdrawn from the seat and the opposite valve member 14 may be moved into closed position and sealed on the opposite side of the seat ring. I am thereby enabled to provide a seal along the line of the valve seat for a materially extended period of time before it is necessary to remove the valves so that the members 14 may be reversed, and a new valve seat inserted. It will be obvious that the flow of fluid may be in either direction through the compound valve which is thus provided.

I wish to employ my valve in connection with devices in which there may be pressure against the flow of fluid through the line. This may be used for example in feeding water to the boiler of the steam engine. In Figs. 4 and 5 I have illustrated how the check valve may be employed in my construction.

Referring particularly to Fig. 5, the valve body 1a has a valve bonnet and valve stem arranged thereon as in the Fig. 1 embodiment but the inlet port 9a is directed at right angles to the valve chamber 19. The outlet port at 10 is provided with a recess 20 to receive the seat ring 12. The structure of the valve body is therefore the same as in the previous embodiment with the exception of the direction at which the fluid enters the valve chamber.

The coupling member 25 is, however, formed to receive a check valve. I provide a guide sleeve 26 across the interior of the coupling member to furnish a lateral support for the valve stem 27. Said valve stem has at its inner end a valve 28 similar in construction to the valve member previously described and adapted to engage with the outer seat 13 upon the seat ring. The valve is held in position against a head 29 on the valve stem and the valve is held in its seat by a spring 30 held in compression between the valve and the inner end 31 of the guide sleeve 26. The sleeve is held in position by laterally extending webs 32 connected with the inner wall of the coupling member. The outlet port from the check valve chamber is directed at an angle and is threaded at 33 for connection in the fluid line.

In the operation of this valve the fluid being pumped to the boiler will enter through the port 9a into the valve chamber 19 and will be forced past the check valve 28 and out through the port 33 to the boiler. When the pump is stopped the check valve will be held in its seat by the spring but under normal conditions there will be leakage past this valve and in such case I close the valve 14 into the valve seat 13, as in the previous embodiment. This will force the check valve from its seat but I will be able to exert sufficient pressure upon the manually operated valve 14 to assure a closure until it is necessary to again force fluid past the valve.

It will be obvious that the check valve may be of any desired construction. In Fig. 4 I have illustrated the same check valve housed within a passage directed at right angles to the opening.

Fig. 4 also illustrates the use of the check valve in any ordinary fluid conducting line. The coupling member 25a in this case forms a valve chamber for the check valve 28 which has the same type construction as that shown in Fig. 5. The valve stem 27 is supported within a guide sleeve 26 mounted upon webs or arms 32 connected with the inner wall of the coupling. The outlet 33a, however, is in direct alignment with the stem 27 of the check valve. The valve seat ring 12 is held in position on the end of the valve chamber by a connecting member 34 which has a flanged connection with the coupling member 25a. This connecting member 34 is threaded at 35 for connection with the fluid conducting line. This connecting member serves to clamp the valve seat in position and serves as a connection in the fluid line, thus enabling the check valve of my construction to be employed not only with the valve but at any position along the fluid line.

It will be understood that my valve is adapted for general use and may be used in various positions and may be arranged in various combinations whereby the control of the fluid flowing through the line may be assured. A feature of particular advantage in my invention lies in its flexibility whereby it may be adapted for various uses and may be combined with various forms of coupling members whereby it may direct the fluid flowing therethrough in a direct line or at various angles relative to the inlet flow.

I claim:

1. A valve body, a valve chamber therein, a bonnet forming a lateral extension on said body, a fluid inlet to said chamber thru one side of said body, a fluid outlet from said chamber thru said body, a coupling forming a passage from said outlet and at an angle to said inlet, a flanged connection for said body and said coupling member at said outlet so as to join said outlet and passage, a double valve seat ring clamped between said coupling and said outlet by said connection, a valve stem in said bonnet, a valve thereon positioned in said chamber and adapted to be moved by rotation of said stem to and from said seat ring, and a check valve in said coupling adapted to engage the other side of said seat ring and on the downstream side away from said chamber.

2. A line valve of the character described comprising a body, a lateral portion thereon threaded for connection to a pipe, a valve chamber in said body, a bonnet on said body, a threaded area therein, a stuffing box on said bonnet, a valve stem having a smooth area to fit said box and a threaded area to fit said thread, a valve member on said stem and movable across said chamber thereby, a coupling, flanges on said body and coupling, means to draw said flanges together, a recessed area about the opening in each said body and coupling, a seat ring having an opening of lesser diameter than the openings in said body and coupling, said ring being fitted in said recesses and clamped between said flanges by said means, a lateral portion on said coupling threaded for connection to a pipe, said coupling being adapted to be affixed by said means in relatively different positions by said means so that said lateral portion extends at different angles relative to said lateral portion on said body, and a spring pressed check valve in said coupling and opening outwardly into the coupling, said check valve engaging said seat ring on the opposite side thereof from the portion receiving said valve member.

MELVIN G. MILLER.